United States Patent Office 3,189,654
Patented June 15, 1965

3,189,654
PROCESS FOR THE PREPARATION OF 1,2-CYCLOALKANEDIONES
Wilfred John Arthur, Charleston, W. Va., assignor to E. I. du Pont de Nemours and Company, Wilmington, Del., a corporation of Delaware
No Drawing. Filed Nov. 15, 1961, Ser. No. 152,646
5 Claims. (Cl. 260—586)

This invention is concerned with a novel process for the synthesis of 1,2-cycloalkanediones from the corresponding cycloalkenes. More specifically, this process is concerned with a process for the synthesis of 1,2-cycloalkanediones from cycloalkenes via the novel intermediates, 1-oxo-2-nitratocycloalkanes.

In the past, there have been no commercially-acceptable, simple procedures for synthesis of 1,2-cycloalkanediones. Thus, for example, the best previously-known method for synthesizing 1,2-cyclohexanedione has been the oxidation of an alpha $CH_2$-group of cyclohexanone with selenous acid; this is not an economically-attractive process.

It is an object of the present invention to provide a novel process for the synthesis of 1,2-cycloalkanediones from the corresponding cycloalkenes. It is a particular object of the present invention to provide a novel synthesis of 1,2-cyclohexanedione from cyclohexene. It is another particular object of this invention to provide a process for the conversion of 2-nitratocyclohexanone (sometimes referred to herein as 1-oxo-2-nitratocyclohexane) to 1,2-cyclohexanedione or its dioxime. Other objects and advantages of this invention will appear hereinafter.

In accordance with the objects of this invention, it has been found that 1,2-cycloalkanediones can be prepared by the treatment of a dispersion of a 1-oxo-2-nitratocycloalkane in a strongly basic aqueous medium at a temperature in the range of 20 to 25° C.

The preparation of 1-oxo-2-nitratocycloalkanes by the addition of $NO_2$ to a cycloalkene under controlled conditions, has been disclosed in a copending application S.N. 152,657 filed by W. J. Arthur on November 15, 1961, now Patent No. 3,095,442.

A preferred application of the process of this invention is for the preparation of 1,2-cyclohexanedione, preferably isolated as its dioxime.

The process of this invention depends upon a rather unexpected and unusual internal oxidation-reduction which it has been discovered occurs upon the treatment of 1-oxo-2-nitratocycloalkanes with aqueous alkali or alkaline earth hydroxides, or other strong bases such as quaternary ammonium hydroxides. Under these strongly-alkaline conditions, it has been discovered that the nitrato-ketone rearranges to form a diketone and a nitrite salt. This can be illustrated for the case of the preparation of 1,2-cyclohexanedione by the following equation:

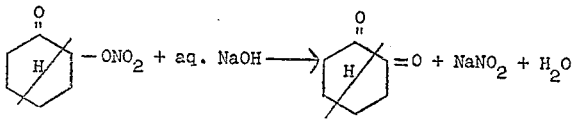

Actually, it is believed that after reaching equilibrium the dione eixsts principally in its enol form illustrated for cyclohexanedione by the formula:

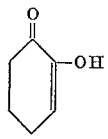

The existence of the dione in the enol form tends to complicate somewhat the recovery of the dione from the aqueous solution. The dione may be etxracted by heavily salting the solution and then using methylisobutyl ketone or lower alkyl ethers to extract the desired product. Some of the dione apparently exists in the aqueous solution in the form of its dimer hydrate. In any case, the acidity of the solution prior to extraction should not be allowed to go below 6.8 in order to avoid release of nitrous acid which might complicate recovery by instituting side reactions. The best method of recovering the 1,2-cycloalkanediones obtained according to the process of this invention is by conversion of the dione to the corresponding dioxime by the use of hydroxylamine or its salts. This can be accomplished by adding a slurry of hydroxylamine hydrochloride in water to the reaction product mixture, until the pH reaches 7.0. Then the reaction mixture can be heated to the range of 40–60° C. and then cooled to 0 to 5° C. in order to precipitate the dioxime.

The preferred method of conversion of the 1-oxo-2-nitratocycloalkane to the dione is by dispersion in aqueous alkali medium at 20–25° C. Usually this conversion is complete within 15 to 30 minutes. In the preferred case, a dispersing agent of the ionic type is employed. Such dispersing agents are salts of long chain alcohol sulfates. Either the alkali metal salts or amine salts are effective surface-active agents, but for this purpose, the alkali metal salts are preferred. The long chain alcohol sulfate salts may be mixtures of alcohols containing from 8 to 16 carbon atoms, or a relatively pure compound such as lauryl alcohol sulfate salt is also satisfactory.

The following examples are provided to illustrate the invention but without intention to be limited by the condition shown therein:

EXAMPLE I

A solution of 52 g. of cyclohexene in 65 ml. of cyclohexane was added slowly to a solution of 90 g. of nitrogen dioxide and 75 ml. of cyclohexane. A small air sparge was utilized throughout the reaction, which was carried out at a temperature in the region of 0–5° C. When the addition of the cyclohexene had been completed, the temperature was allowed to rise to 20° C. and the air sparge was increased for five minutes to initiate removal of nitrogen dioxide. A heavy oily lower layer was decanted and held at 25–30° C. at 20 mm. of mercury absolute until the bulk of the nitrogen dioxide had been removed. This layer comprised 105 g. of a green, crude oil consisting essentially of 2-nitratocyclohexanone. The crude 2-nitratocyclohexanone was added to 500 ml. of water containing 50 g. of sodium hydroxide and 100 mg. of a dispersing agent as described hereinabove. The dispersion was stirred vigorously for 30 minutes at 25° C.

For recovery of the cyclohexanedione, a solution of 80 g. of hydroxylamine hydrochloride in 100 ml. of water which had been partially neutralized with 25 g. of sodium hydroxide was added. In order to adjust the final solution pH to 7.0, an additional 6.0 g. of hydroxylamine hydrochloride was added. This solution mixture was then heated to 40° C. and, after cooling to 20° C., allowed to stand for 16 hours. For recovery of the dioxime, the solution was cooled to 0° C. and the crude product which precipitated was collected by filtration and found to weigh 47.5 g.

Recrystallization of this material from 360 ml. of water gave 24.5 g. of product. An additional 4.0 g. of dioxime was obtained by extraction of the crude mother liquor with ethyl acetate. After final drying, the yield of dry 1,2-cyclohexanedioxime was 25.5 g.

EXAMPLE II

A solution of 7.95 g. of redistilled 2-nitratocyclohexanone was added to 50 ml. of water containing 5.9 g. of sodium hydroxide and 20 mg. of an ionic surfactant as disclosed hereinabove. The mixture was stirred vigorously for 30 minutes while holding the temperature between 20 and 25° C.

For recovery of the cyclohexanedione, approximately 7.3 g. of hydroxylamine hydrochloride was slurried in 10 ml. of water and added incrementally to provide a final solution pH of 7.0. This reaction mixture was stirred for 10 minutes at 50° C., and then iced to cool it to 0–5° C., and the dioxime was collected by filtration. The yield of crude product was 5.0 g. The filtrate was extracted at 30° C. with one-half of its volume of ethyl acetate in three portions, the solvent was then separated and distilled off, leaving about 10% of the original ethyl acetate. From this solution, an additional 1.1 g. of solid crude product was obtained upon cooling and filtering. For purification of the crude product, recrystallization from ethyl acetate, ethylene chloride, or other non-reactive organic solvents can be employed. If desired, decoloration of the product can be achieved by treatment of the solutions with activated carbon. After such treatment, the product of this example weighed 4.1 g. after drying in a vacuum at 70–100° C. This product had a melting point of 175–185° C.

EXAMPLE III

A solution was prepared of 16 g. of 2-nitratocyclohexanone in 50 ml. of water containing 12.0 g. sodium hydroxide and 30 mg. of a surfactant as described hereinabove. The mixture was stirred as a dispersion for 30 minutes while maintaining the temperature at 22–25° C.

For recovery of the cyclohexanedione, a slurry of 13 g. of hydroxylamine hydrochloride in 20 ml. of water was added to the above mixture while continuing vigorous stirring. An additional 1.0 g. of hydroxylamine hydrochloride was added to obtain a solution pH of 6.9. This solution was then heated to 60° C. for 2 minutes. After cooling to 0° C. and filtering the precipitated product, 10.8 g. of crude dioxime was obtained. Extraction of the filtrate with three portions of ethyl acetate totalling one-half volume produced an additional 1.4 g. of the dioxime.

The entire crude product was dissolved in 150 ml. of water at 80° C., filtered, and recrystallized to produce 9.7 g. of wet product which on drying gave 8.4 g. of crystalline 1,2-cyclohexanedioxime.

The dioxime can be hydrolyzed by conventional acid hydrolysis to regenerate 1,2-cyclohexanedione.

1,2-cycloalkanediones are useful for conversion to dicarboxylic acids by oxidation with aqueous nitric acid. In the form of dioximes, they are useful for scavenging Group VIII metal ions from solutions, since highly-colored solid addition products are formed for instance, from 1,2-cyclohexanedioxime and nickel ions or cobalt ions in solution.

I claim:

1. A process for the preparation of a 1,2-cycloalkanedione which comprises dispersing 1-oxo-2-nitratocycloalkane in an aqueous solution of a strong base by vigorous agitation at a temperature in the range of 20°–25° C.

2. A process according to claim 1 in which the strong base is selected from the group consisting of alkali metal hydroxides and alkaline earth metal hydroxides.

3. A process according to claim 1 which is carried out in the presence of an ionic dispersing agent selected from the class consisting of the alkali metal salts and the amine salts of alcohol sulfates derived from alcohols containing from 8 to 16 carbon atoms and mixtures thereof.

4. A process for the preparation of 1,2-cyclohexanedione which comprises dispersing 2-nitratocyclohexanone in an aqueous solution of sodium hydroxide at a temperature in the range of 20°–25° C. by vigorous stirring.

5. A process according to claim 4 which is carried out in the presence of an ionic dispersing agent selected from the class consisting of alkali metal salts and amine salts of alcohol sulfates derived from alcohols containing from 8 to 16 carbon atoms and mixtures thereof.

References Cited by the Examiner

Hach et al.: "Organic Syntheses," vol. 32, pp. 35–38 (1952), QD 26207.

LEON ZITVER, *Primary Examiner.*